United States Patent [19]
Showalter et al.

[11] Patent Number: 5,304,256
[45] Date of Patent: Apr. 19, 1994

[54] SCARFING METHOD

[75] Inventors: Michael S. Showalter; John G. Dawson, Jr., both of Florence; Frank J. Gusky, Quinby, all of S.C.

[73] Assignee: ESAB Welding Products, Inc., Florence, S.C.

[21] Appl. No.: 948,027

[22] Filed: Sep. 21, 1992

Related U.S. Application Data

[63] Continuation-in-part of Ser. No. 805,111, Dec. 9, 1991, Pat. No. 5,234,658.

[51] Int. Cl.⁵ .............................................. B23K 7/06
[52] U.S. Cl. ...................................... 148/202; 266/51
[58] Field of Search ................ 148/202, 203, 205; 266/48, 51, 52

[56] References Cited

U.S. PATENT DOCUMENTS

| | | | |
|---|---|---|---|
| 2,521,199 | 9/1950 | Babcock | 266/51 |
| 2,838,431 | 6/1958 | Allmang et al. | 148/202 |
| 3,230,116 | 1/1966 | Wandelt | 266/51 |
| 3,231,431 | 1/1966 | Allmang | 148/202 |
| 3,477,646 | 11/1969 | Lytle | 266/51 |
| 3,647,570 | 3/1972 | Lytle | 266/51 |
| 4,038,108 | 7/1977 | Engel et al. | 266/51 |
| 4,115,154 | 9/1978 | Fuhrhop | 148/202 |
| 4,173,499 | 11/1979 | Hölemann | 266/51 |
| 4,455,176 | 6/1984 | Fuhrhop | 148/202 |
| 4,501,624 | 2/1985 | Lotz | 266/51 |
| 4,765,597 | 8/1988 | Fuhrhop et al. | 266/51 |
| 4,954,683 | 9/1990 | Hatch | 266/51 |

FOREIGN PATENT DOCUMENTS

274377 of 1990 Japan.

Primary Examiner—Scott Kastler
Attorney, Agent, or Firm—Bell, Seltzer, Park & Gibson

[57] ABSTRACT

A thermochemical scarfing method is disclosed which allows a greater diagonal standoff distance from the metal workpiece during preheating. The method includes preheating the end of the metal workpiece, and then scarfing the workpiece by directing a scarfing oxygen stream onto the workpiece at an acute angle and while moving the workpiece past the oxygen outlet port. The preheating step includes generating a high speed stream of oxidizing gas and a concentric stream of fuel gas coaxially about the central stream, so that the momentum of the central stream is maintained. As a result, the effective flame heating distance may be extended, and the manifold and head assembly which supports the preheating gas nozzles may be moved back from the workpiece a significant standoff distance so as to avoid damage from dislodged molten metal slag.

18 Claims, 8 Drawing Sheets

SCARFING METHOD

CROSS REFERENCE TO RELATED APPLICATION

This is a continuation in part of copending application Ser. No. 07/805,111 filed Dec. 9, 1991, now U.S. Pat. No. 5,234,658.

FIELD OF THE INVENTION

This invention relates to a method for thermochemically scarfing a metal workpiece and which allows a significant diagonal stand-off distance from the end of the workpiece during preheating and scarfing initiation so that molten metal is not blown onto the scarfing apparatus.

BACKGROUND OF THE INVENTION

Steel slabs commonly are conditioned by moving scarfing units along the top, bottom and side surfaces of a steel slab to eliminate surface defects such as cracks, seams and slag intrusions. One conventional scarfing apparatus includes top, side and bottom scarfing units that are mounted across the width and end portions of a support. The top, side and bottom units are arranged to scarf all sides of the slab.

Both top, side, and bottom units include a manifold and head assembly, which receives and distributes oxygen and fuel gas to upper and lower preheat blocks. The upper and lower preheat blocks are spaced from each other to define between the two blocks an oxygen scarfing slot through which a quantity of oxygen is blown onto the slab surface to enable scarfing. The lower preheat block includes a fuel gas channel having a discharge end positioned adjacent the oxygen slot for discharging a fuel gas adjacent the oxygen flow.

As illustrated for example in U.S. Pat. No. 4,115,154, the upper preheat block typically is a one-piece unit that includes oxygen and fuel gas channels each having discharge orifices to define nozzles through which a combination of oxygen and fuel gas is discharged for preheating the slab before scarfing. Later, a postmix flow of oxygen and fuel gas provides for scarfing. To maintain a proper vertical stand-off distance of the nozzle exit from the steel slab, the top and bottom scarfing units include riding shoes positioned on respective lower preheat blocks. Because the integrally formed nozzles do not provide for a high speed gas flow outward from the scarfing units, the total diagonal stand-off distance, i.e., the vertical stand-off distance and horizontal stand-off distance (the lead distance from the scarfing unit to the slab) is small, and the scarfing units must be placed in close proximity to the slab during preheating. Thus, in a conventional scarfing unit as illustrated in the above referenced patent, the upper preheat block extends forward and hangs over the lower preheat block to direct the preheating stream of gas discharged from the upper preheat block onto the slab during preheating.

Because the upper preheat block extends forwardly beyond the lower preheat block during initial preheating of the slab, the molten steel formed on the slab edge may drip onto portions of the upper preheat block positioned below the slab. The molten steel may damage the upper preheat block requiring reconstruction or replacement of the preheat blocks. To avoid this problem, during initial preheating, the scarfing units are positioned adjacent the slab and heat the slab one to two inches inward of the end to prevent steel and slag from dripping onto the forwardly extending preheat block. As a result of starting the scarfing process inward from the end of the steel slab, the one or two inches of unscarfed steel must be either scrapped or hand scarfed, leading to excessive production costs.

Additionally, through continued use, the discharge ends forming the upper preheat nozzles may wear. Because the preheat nozzles are integrally formed in the upper preheat block, any damage to the nozzle area mandates either replacement of the entire upper preheat block, or removal of the damaged area and the brazing of new material onto the upper preheat block.

SUMMARY OF THE INVENTION

It is accordingly an object of the present invention to provide a scarfing method that allows a greater diagonal standoff distance from the metal workpiece during preheating and scarfing, to permit initial scarfing at the front portion of the slab in such a way that molten metal is not blown onto the scarfing apparatus.

It is another object of the present invention to provide a method of initiating end scarfing on the end of a steel slab and in which the scarfing apparatus is positioned a diagonal standoff distance sufficient to allow full width preheating of the end of the slab without having a significant amount of molten steel and other particles fall or be blown onto the scarfing apparatus.

The above and other objects and advantages of the present invention are achieved in the embodiments illustrated herein by the provision of a method for thermochemically scarfing a metal workpiece and which includes the step of preheating an area on the surface of a stationary workpiece. This preheating step includes directing a preheating gas stream toward the area, and the preheating gas stream comprises a high speed central stream of oxidizing gas and a concentric stream of fuel gas coaxially about the central stream so as to be essentially parallel to the flow of the central stream. As a result, the momentum of the central stream is substantially maintained. Thereafter a stream of scarfing oxidizing gas is directed at an acute angle toward the preheated area of the workpiece, and relative movement is initiated between the workpiece and the stream of scarfing oxidizing gas so as to produce a scarfing cut.

In the preferred embodiment, the preheating gas stream is stabilized, by directing a first stabilizing stream of oxidizing gas immediately above the preheating gas stream, and directing a second stabilizing stream of oxidizing gas immediately below the preheating stream. Preferably, the second stabilizing stream is discharged from the same port which later discharges the scarfing oxidizing gas.

The method of the present invention utilizes an apparatus which comprises a manifold and head assembly which includes upper and lower preheat blocks, with the blocks being spaced from each other to define an oxygen scarfing slot therebetween. A plurality of discharge nozzles are mounted adjacent to each other in a row above and parallel to the slot, with each nozzle including a central bore for receiving an oxidizing gas from the manifold and head assembly and discharging the same as the high speed central stream. Outer channel means is also provided for receiving a fuel gas from the manifold and head assembly and discharging the same in a substantially concentric stream disposed coaxially about and parallel to the central stream of oxidizing gas.

In accordance with the more specific aspects of the present invention, the method includes the steps of positioning the manifold and head assembly at a diagonal standoff distance from an end of an elongate metal workpiece, preheating the end of the metal workpiece and including generating a high speed stream of oxidizing gas through the central bore of the nozzles and while generating a stream of fuel gas through the outer channel means of the nozzles. The streams are ignited and directed toward the end of the metal workpiece, and then the streams of the oxidizing gas and fuel gas from the nozzles are reduced to a low flow rate. Scarfing of the workpiece then commences, which includes generating a high speed stream of scarfing oxidizing gas from the slot, and while moving the workpiece horizontally toward and then past the manifold and head assembly so as to produce a scarfing cut.

In the preferred embodiment, the preheat nozzles are nozzle inserts. Each nozzle insert comprises a longitudinally extending, substantially cylindrically configured nozzle member having opposing gas entrance and discharge ends. The central bore extends axially through the nozzle member. Each nozzle member is mounted within a mounting hole of the upper preheat block. An O-ring is positioned on the outer circumference of the nozzle member, and aids in removably securing the nozzle member in the mounting holes. The O-ring also serves as a seal to segregate the oxygen and the fuel gas. Longitudinally extending, substantially parallel flutes are integrally formed on the outer surface of the nozzle member and form fuel gas flow channels through which fuel gas received from the manifold and head assembly is directed into a substantially, parallel, concentric flow around the central flow of oxygen to prevent the steep fuel gas flow intersection with the oxygen and to maintain the momentum of the oxygen as it exits the central bore.

In the preferred embodiment, the central bore of the nozzle member includes a first converging portion and a second diverging portion terminating in an oxygen discharge end of the nozzle member. The diameter of the diverging portion at the oxygen discharge end is less than the diameter of the bore before converging. This construction provides for a high speed, and preferably supersonic, oxygen flow from the central bore.

In the preferred embodiment, the lower preheat block includes a fuel gas flow channel and discharge end positioned adjacent the oxygen slot defined between the upper and lower preheat blocks. The upper preheat block includes a slot positioned above the row of nozzles. The slot extends through the upper preheat block for receiving a flow of oxygen from the manifold and head assembly and forming a shielded oxygen flow for the gas exiting the discharge end of the nozzles.

In the preferred method, the diagonal standoff distance is between about six to ten inches during preheating of the slab. The horizontal standoff distance from the steel slab is between about three to five inches during preheating of the slab, and the vertical standoff distance from the steel slab is between about one and one half and three inches.

The step of moving the workpiece includes accelerating the workpiece over a predetermined time period in order to reach a final scarfing speed, and in accordance with the preferred embodiment of the invention, the manifold and head assembly is closed so as to move into contact with the moving workpiece during the time the workpiece is accelerating. Also, it is preferred to accelerate the workpiece in two stages, with the closing of the manifold and head assembly occurring during the second stage.

BRIEF DESCRIPTION OF THE DRAWINGS

Some of the objects and advantages of the present invention having been set forth above, other objects and advantages will appear as the description proceeds, when taken in conjunction with the accompanying drawings, in which.

DETAILED DESCRIPTION OF THE PREFERRED EMBODIMENT

Figure 1:
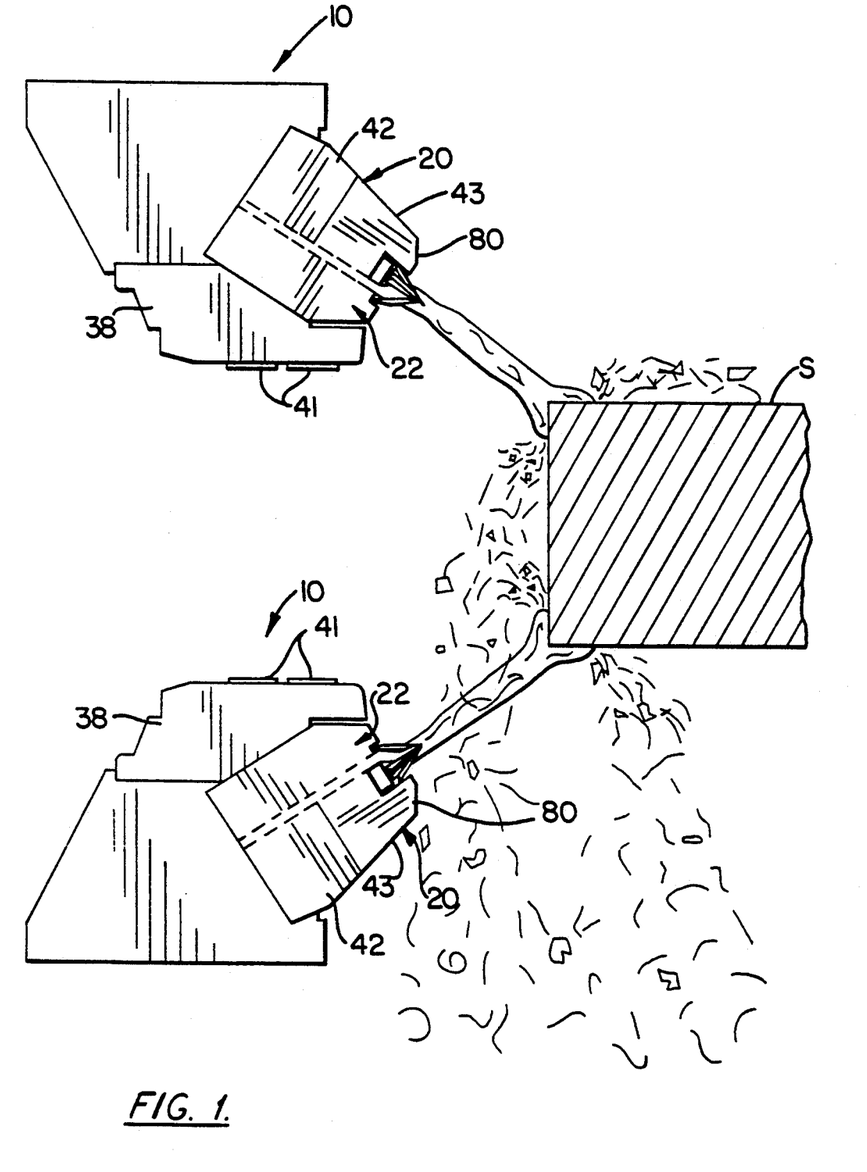
FIG. 1 is a schematic side elevation view of upper and lower scarfing apparatus positioned for preheating and scarfing of a steel slab.

Referring now to the drawings, and more particularly to FIG. 1, there is illustrated the scarfing apparatus 10 in accordance with the present invention. Two scarfing apparatus 10 are illustrated in two positions, one above and one below the plane of a steel slab to be scarfed. The scarfing apparatus 10 are usually mounted across the width of supports 11 (FIG. 6) and arranged to scarf the top and bottom of a slab S. Additionally, side scarfing units 10a are positioned on supports 11 to aid in scarfing the sides of a slab S (FIG. 6), which normally is positioned on a movable table (not shown) that can extend through the rectangular housing configuration defined by the scarfing apparatus.

In accordance with the present invention, the scarfing apparatus 10 is constructed to allow a stand-off distance from a slab during preheating and scarfing so that preheating and scarfing can occur on the end corner of the slab without having slag or other hot, molten metal fall onto the apparatus, as occurs in other, conventional scarfing units during initial starting adjacent the slab edge.

Figure 2:
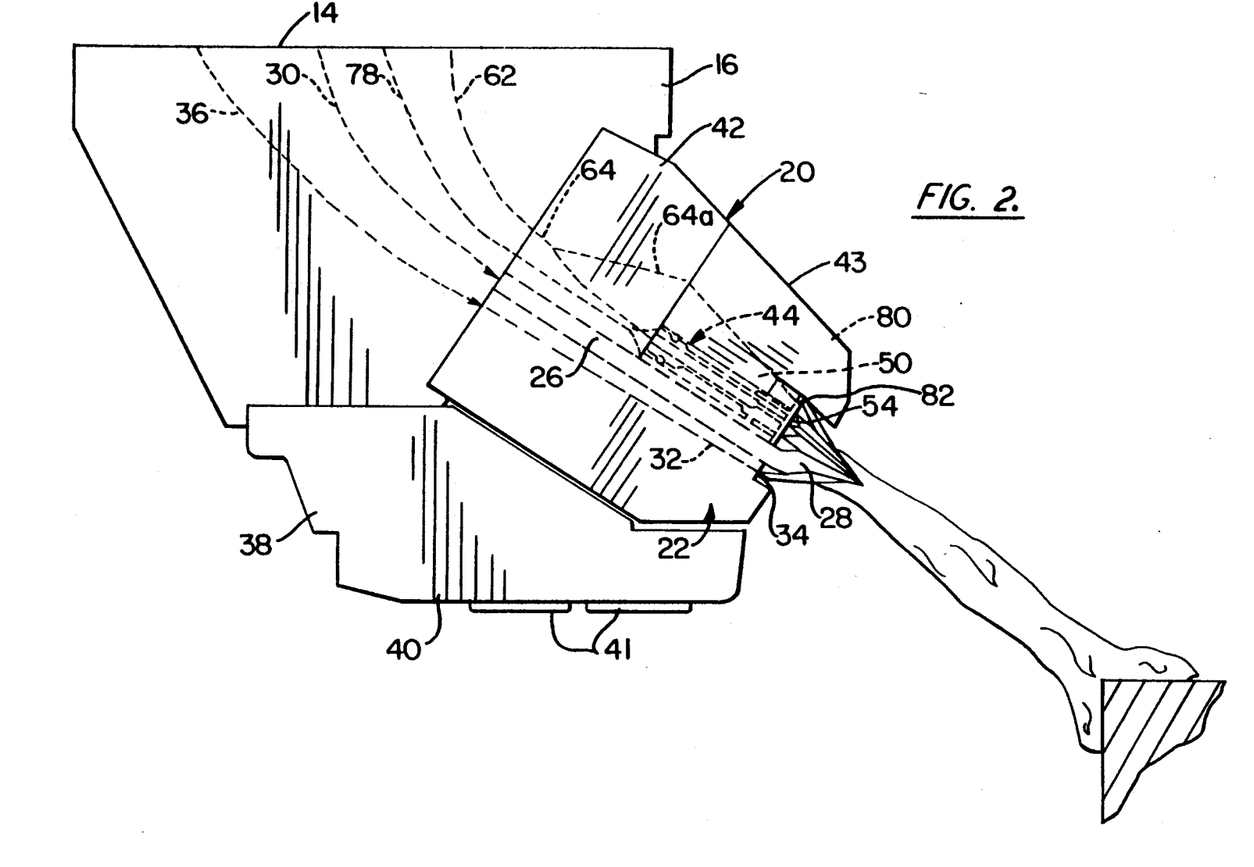
FIG. 2 is an enlarged, schematic side elevation view of the upper scarfing apparatus of FIG. 1.

As shown in greater detail in the schematic illustration of FIG. 2, the apparatus includes a manifold and head assembly 14, typically formed from a bronze or copper material, and having fuel and oxygen gas channels (shown schematically) which receive and distribute oxygen and fuel gas. The manifold and head assembly 14 includes a formed slot 16 along one edge in which upper and lower preheat blocks 20, 22 are mounted. Both the upper and lower preheat blocks 20, 22 extend outward from the manifold and head assembly 14 a substantially equal distance to each other. The upper and lower preheat blocks are preferably formed from copper.

The upper and lower preheat blocks 20, 22 are spaced from each other to define an oxygen slot 26 and discharge orifice 28 of predetermined size for receiving a flow of scarfing oxygen from the manifold and head assembly and discharging the scarfing oxygen through the discharge orifice onto the steel slab S (FIG. 2). An oxygen flow channel, illustrated schematically at 30, extends through the manifold and head assembly 14 and connects to the entrance end of the oxygen scarfing slot 26.

The lower preheat block 22 includes a fuel gas flow channel, indicated schematically at 32, and a discharge end 34 positioned adjacent to the scarfing slot 26. Fuel gas flows through a fuel gas flow channel 36 of the manifold and head assembly 14 into the fuel gas passageway 32 and exits as a scarfing flame during scarfing. A riding shoe 38 is positioned along the underside of the lower preheat block 22 and the manifold and head assembly 16. The riding shoe 38 includes a lower slab engaging surface 40 having slab engaging skids 41 adapted to contact the slab to position the scarfing discharge orifice 28 as well as the other exiting fuel and oxygen flows a predetermined distance from the steel slab. As shown in FIG. 1, the lower scarfing apparatus 10 is inverted and the riding shoe 38 is positioned to engage the bottom surface of the steel slabs S.

Figure 3:
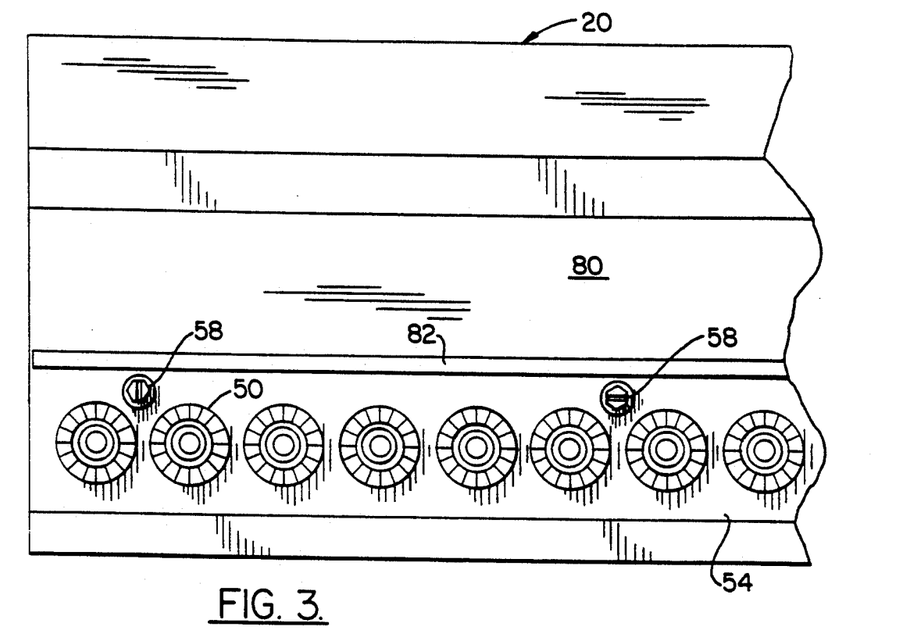
FIG. 3 is a front elevation view of the scarfing apparatus showing a plurality of nozzle inserts mounted in the upper preheat block.
Figure 4:
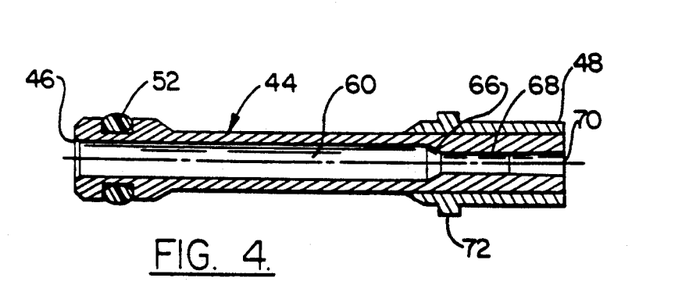
FIG. 4 is a sectional view of a nozzle insert in accordance with a preferred embodiment of the present invention.
Figure 9:
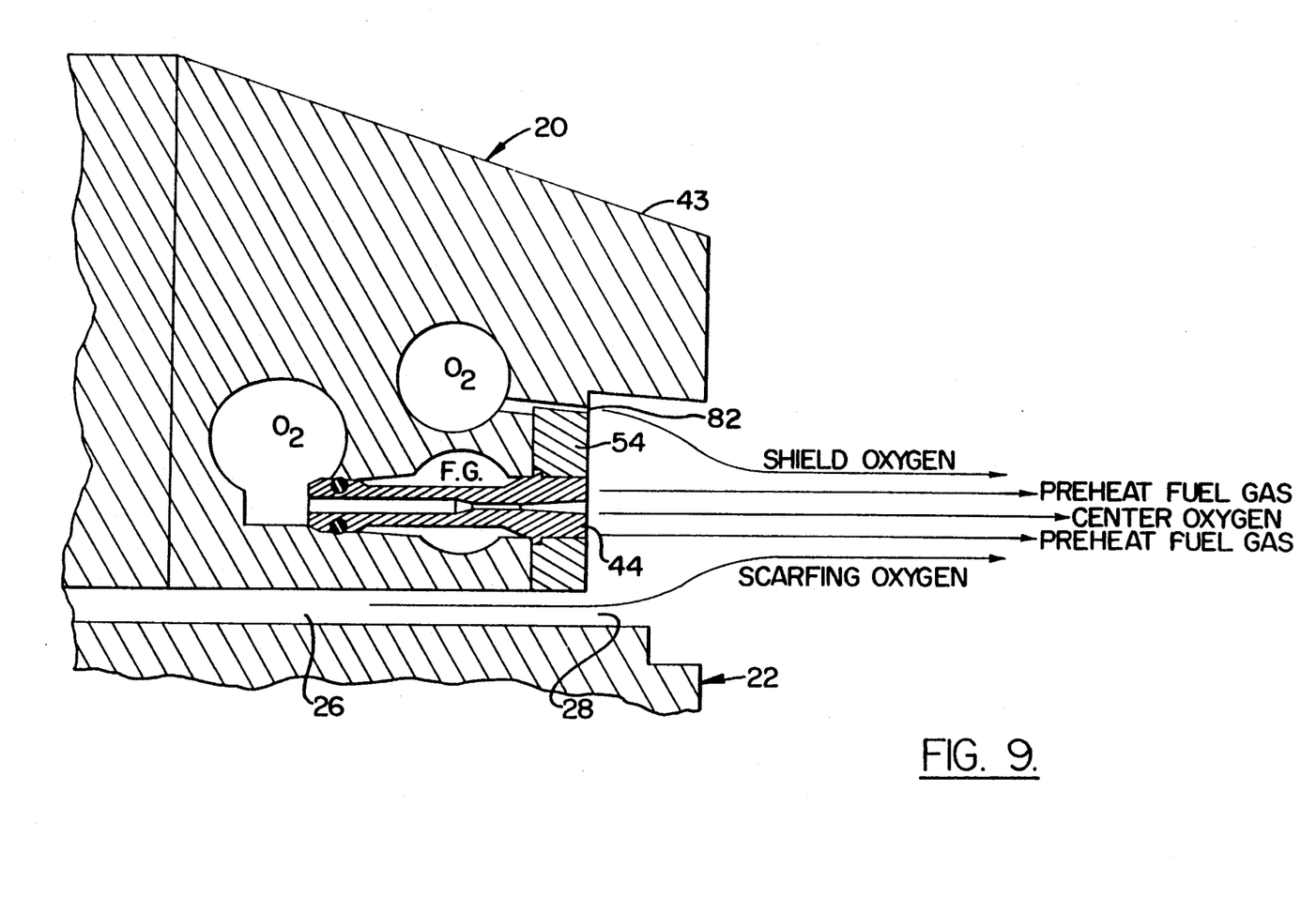
FIG. 9 is a fragmentary sectional view of the upper preheat block and illustrating the preheating gas streams.

Each upper preheat block 20 includes a base member 42, and an extension member 43 secured to the base member 42 and extending forwardly therefrom. A plurality of preheat nozzle inserts 44 (FIGS. 3 and 4) are mounted adjacent to each other in a row across the width of the extension member 43. Each nozzle insert 44 is formed as a longitudinally extending, substantially cylindrically configured nozzle member extending into the extension member 43 (FIG. 9). The nozzle members 44 preferably are formed of brass or copper, and have opposing gas entrance and discharge ends 46, 48 (FIG. 4). Each nozzle member 44 is mounted within a mounting hole 50 in the extension member 43. An O-ring 52 is positioned on the outer circumference of the nozzle member 44 at the entrance end and aids in centering and removably securing the nozzle member 44 within the mounting holes 50 of the upper preheat block 20. Additionally, the O-ring serves as a seal to segregate oxygen and fuel gas.

A mounting plate 54 is secured to the upper preheat block and engages the discharge ends 48 of the nozzle members 44. The mounting plate 54 also aids in retaining the nozzle members 44 within the mounting holes 50. The mounting plate 54 includes holes which align and center the discharge ends 48 of the nozzle members 44. The mounting plate 54 is secured to the upper preheat block 20 by fasteners, such as machine bolts 58 (FIG. 3).

As illustrated in greater detail in FIG. 4, a central bore 60 extends axially through the nozzle member 44. An oxygen flow channel 62 within the manifold and head assembly 14 passes gas into an upper preheat block fuel channel 64 and through the central bore 60 in communication with the channel 64 (FIG. 2). The central bore 60 includes a first converging portion 66, a throat portion 68, and a diverging end portion 70 (FIG. 4). The converging portion 66 tapers inward at a high angle as shown in FIG. 4. The second, diverging portion 70 tapers outward at a smaller angle. In the preferred embodiment the diameter of the diverging portion 70 at the oxygen discharge end is less than the diameter of the bore before converging. However, the bore before converging could be a smaller diameter than the exit diameter, or the bore could be designed straight completely through. Thus, oxygen gas received into the bore is constricted first within the converging portion where the gas velocity is increased. The oxygen then exits the discharge end as a high-velocity, preferably supersonic, accurately directed stream against the slab S.

Figure 5:
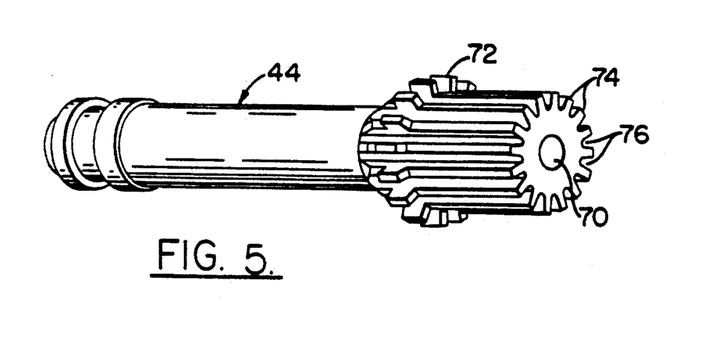
FIG. 5 is a perspective view of the nozzle insert shown in FIG. 4.

A retaining ring 72 is formed on the discharge end 48 of the nozzle member 44. As best seen in FIG. 5, the discharge end 48 includes elongate, concentric flutes 74 forming fuel gas flow channels 76 around the nozzle member periphery through which fuel gas flows outward from the nozzle in substantially parallel, concentric flow around the central flow of oxygen. Fuel gas is delivered through an upper preheat block channel 78 (FIG. 2) and then onto the outer surface of the nozzle member 44 and into the fuel gas channels 76 by the flutes. The concentric flow of fuel gas around the central flow of oxygen prevents a fuel gas flow intersection with the oxygen adjacent the nozzles. Thus, the momentum of the oxygen is maintained as it exits the nozzle member 44. Mixing of oxygen and fuel gas occurs further downstream to produce a hotter flame at a more extended distance from the preheat blocks.

A forwardly protruding portion of the extension member 43 forms a shield plate 80 (FIGS. 2 and 3), which is positioned in spaced relation above the insert plate 54 to form a slot 82. An oxygen flow channel 64a extends off from the central oxygen flow channel 64 and through the upper preheat block to the slot 82. Oxygen discharged through the slot 82 forms a shielded oxygen flow for the oxygen and fuel gas flowing from the nozzle member 44.

During operation, the apparatus 10 are positioned as shown in FIG. 1, including the side scarfing units (not shown), and the flows of oxygen and fuel gas through the various passageways are controlled to preheat the slab S. Because the nozzle member 44 provides an efficient oxygen and fuel gas flow outward from the apparatus 10 without a sharp fuel gas flow intersection with the oxygen adjacent the nozzles, the momentum of the oxygen exiting the central bore is maintained until it intersects the fuel gas further downstream from the preheat blocks. As a result, a more enhanced and hotter flame is achieved, and the diagonal standoff distance is increased as compared to other conventional scarfing apparatus. With the present invention, a diagonal standoff distance as high as fifteen inches has been achieved. As a result of this greater diagonal stand-off distance, during initial pre-heating of the slab S, the slag and molten steel cannot drop onto the apparatus and the scarfing operation can begin at the end portion of the slab. Additionally, during continued use of the apparatus, the discharge end of the nozzle member may become worn. The nozzle member 44 can be readily replaced by removing the mounting plate 54, and then removing the damaged nozzle member 44. A new nozzle member 44 is inserted within the mounting hole 50.

Figure 7:
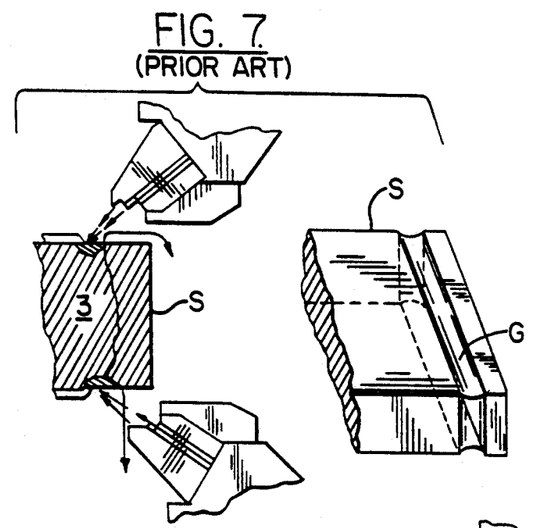
FIG. 7 is a schematic illustration of a prior art method of initiating end scarfing of a steel slab.

In FIG. 7, the prior art method of initiating near end scarfing one to two inches in from the end of a steel slab is illustrated and shown with a prior art apparatus having an overhanging preheat block. As shown, the scarfing apparatus begins its preheat one or two inches inward of the edge. In this preheat position, the apparatus has about a 0.5 inch vertical standoff above the slab, creating about a 1.25 inch diagonal standoff distance. As a result of starting the preheat inward from the slab end, a gullet G is formed across the width of the slab edge.

Figure 8:
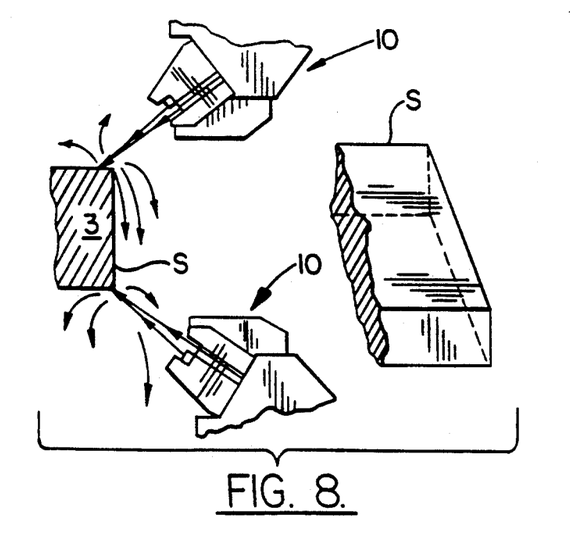
FIG. 8 is a schematic illustration of the method of initiating end scarfing of a steel slab in accordance with the present invention.

Looking now at FIG. 8, a preferred method of scarfing in accordance with the present invention is illustrated. During initial preheating, the scarfing apparatus is positioned as shown in FIG. 8. As compared to the prior art preheating method in which the diagonal standoff distance is only 1.25 inches (FIG. 7), the diagonal standoff distance of the present invention is greater, ranging from six to ten inches. The horizontal standoff distance is preferably between about three to five inches, as compared to the other prior art method in which there is no horizontal standoff separation and the prior art apparatus is positioned above the steel slab. The vertical standoff distance is preferably between about 1.5 to 2.0 inches as compared to the prior art method in which the vertical standoff preheating distance is only 0.5 inches.

As used herein, the diagonal standoff distance may be defined as the distance from the front of the nozzles 44 to the front corner of the workpiece. Similarly, the horizontal standoff distance is the horizontal distance between a vertical plane containing the front of the nozzles and the end of the workpiece, and the vertical standoff distance is the vertical distance between a horizontal plane containing the skids 41 and the upper surface of the workpiece.

Figure 6:
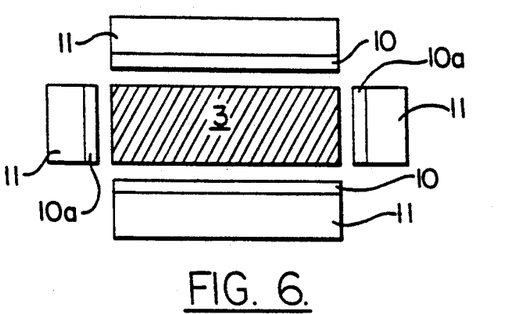
FIG. 6 is a schematic end view of scarfing apparatus positioned around a steel slab to be scarfed.

The steps involved in the initial starting of the scarfing process will now be described in more detail with reference to FIGS. 9 and 10. To initiate preheating, the table (not shown) on which the steel slab rests is moved into a position in which the scarfing apparatus 10 are positioned over and adjacent the slab. The scarfing units are closed as in conventional scarfing operations, and then the table is retracted into the preheat position (FIGS. 6 and 8). The scarfing apparatus preheat fuel gas is ignited at a low flow rate, and the preheat oxygen is also discharged at a low flow rate. Also, in the illustrated embodiment, a small volume flow of oxygen is concurrently directed through the scarfing slot 26 to provide a lower shield flow. The preheat fuel gas flow rate is then increased. Just after the preheat fuel gas flow rate is increased, the oxygen preheat flow is increased, and as best seen in FIG. 9, this flow includes a stabilizing stream immediately above the preheating gas stream emanating from the nozzles 44. The oxygen flow rate is increased to about twice as much as normal oxygen preheat flow rates for the prior art methods and scarfing apparatus.

In one preferred embodiment, the central stream of oxygen is discharged at a substantially supersonic speed, and the concentric stream of fuel gas is discharged at a speed less than the speed of the central stream. Also, the upper and lower oxygen stabilizing streams are discharged at respective speeds which are less than the speed of the stream of fuel gas.

Figure 10:
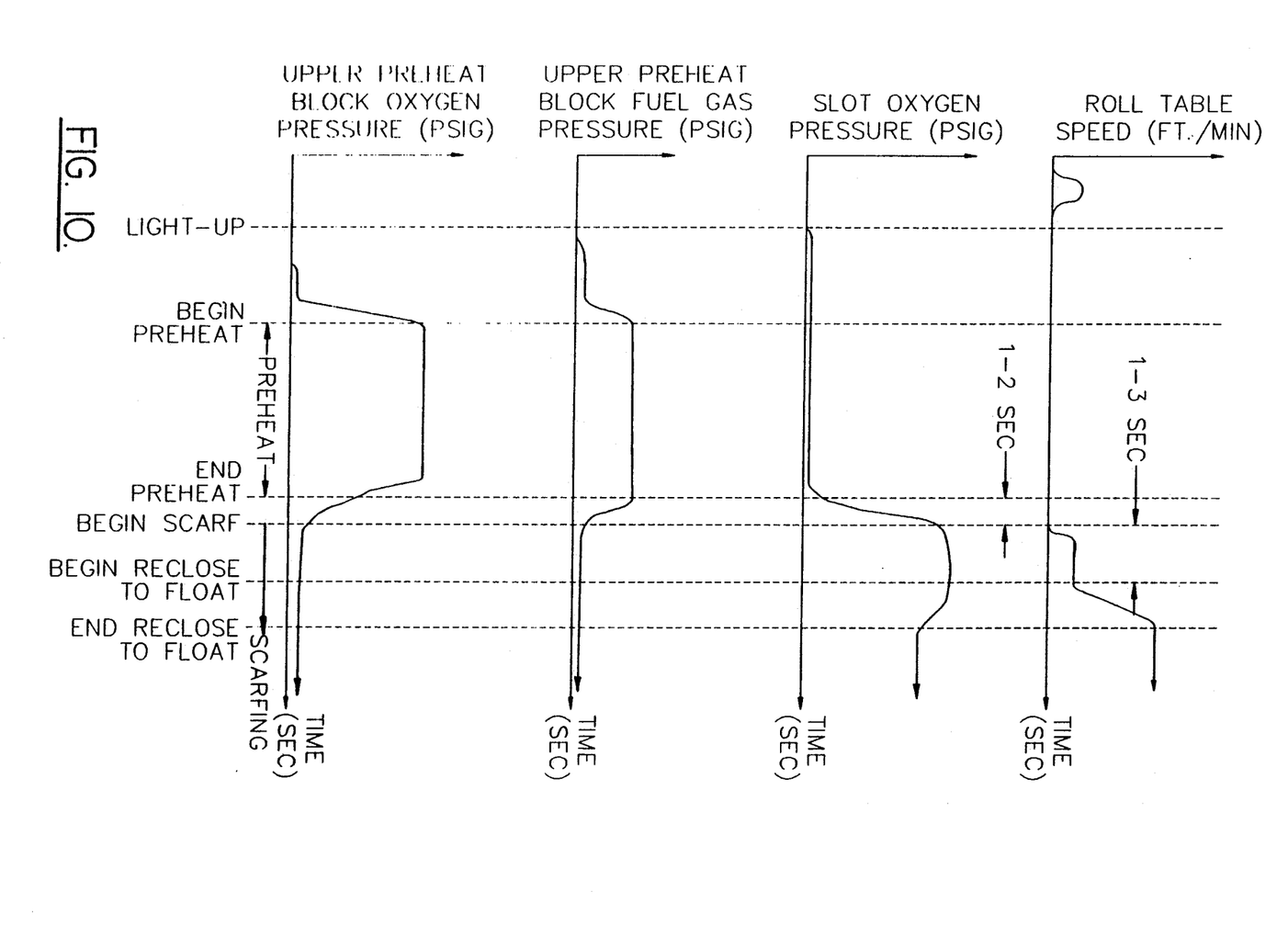
FIG. 10 is a graph of various steps involved in the preheating and initiation of end scarfing of a steel slab.

Once the steel slab is preheated, the preheat oxygen flow is substantially reduced as shown in FIG. 10, and the flow of scarfing oxygen is generated. When the scarfing oxygen has reached its peak pressure and flow rate, the preheating fuel gas is reduced, and the table holding the steel slab is moved toward the scarfing apparatus. In the preferred embodiment, the "dead time" in which the scarfing oxygen remains until table movement is about two seconds.

The table is initially moved forward at a first relatively slow speed, which is typically about 3 to 4 meters per minute, which is about one-fourth the normal speed of scarfing. After a predetermined period, its speed is increased to the normal scarfing speed, which is about four times as fast as the first speed. The flow rate of the oxygen is decreased slightly at the time when the table speed reaches the normal scarfing speed. Scarfing then continues as in normal prior art apparatus. Preferably, a stream of fuel gas is concurrently discharged from the discharge end 34 of the fuel gas channel 32 of the lower block, to facilitate maintenance of the oxidizing reaction. Also, as illustrated in FIG. 10, the manifold and head assembly closes so that it moves into contact and "floats" on the moving workpiece. The closing operation is commenced substantially concurrently with the acceleration of the workpiece from its initial speed to its operating or final scarfing speed. Also, the closing operation is timed to terminate substantially concurrently with the workpiece reaching its final scarfing speed.

Figure 11:
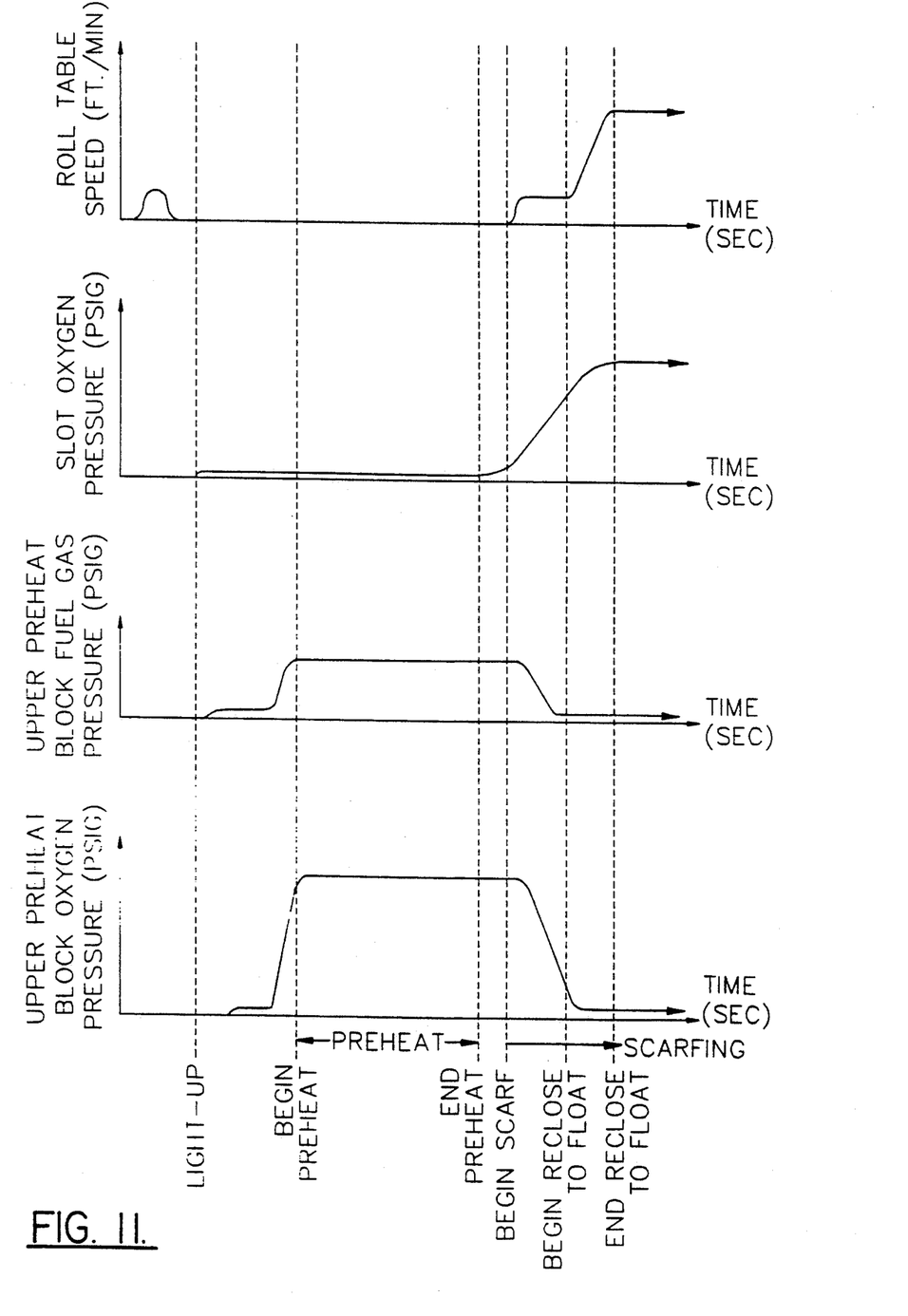
FIG. 11 is a graph similar to FIG. 10 but illustrating a modified procedure.

FIG. 11 illustrates a modification of the starting procedure. In this embodiment, the scarfing oxygen delivery does not commence as early as in the embodiment of FIG. 10, nor does it ramp up to a large rate and then back off as in FIG. 10. In FIG. 11, the scarfing oxygen is smoothly increased during the acceleration of the table. The choice of these operating parameters is dependent in large measure to the initial standoff distance between the manifold and head assembly, and the workpiece.

Figure 12:
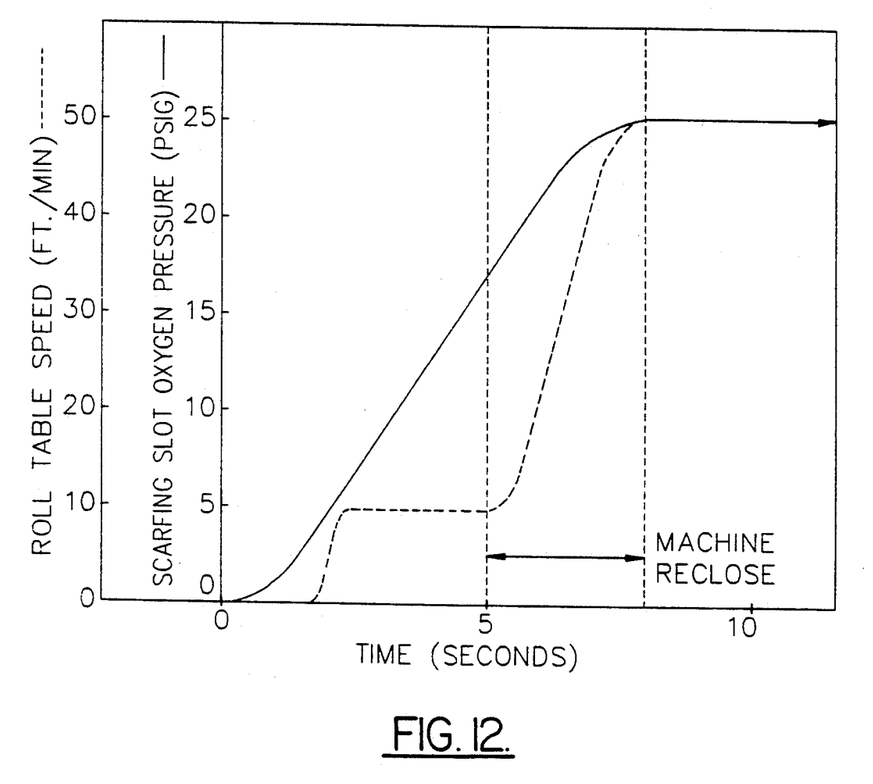
FIG. 12 is a graph illustrating the relationship roll table (i.e. workpiece) speed and scarfing oxygen pressure during scarfing initiation.

FIG. 12 illustrates the timing of the machine closing process and workpiece acceleration in the embodiment of FIG. 11, in somewhat more detail.

In the drawings and specification, there has been set forth a preferred embodiment of this invention, and even though specific terms are used, they are used in a generic and descriptive sense only and not for purposes of limitation.

That which is claimed is:

1. A method for thermochemically scarfing a metal workpiece comprising the steps of preheating an area on the surface of a stationary workpiece, and including directing a preheating gas stream toward said area, said preheating gas stream comprising a high speed central stream of oxidizing gas and a concentric stream of fuel gas coaxially about the central stream so as to be essentially parallel to the flow of the central stream and thereby permit the momentum of the central stream to be substantially maintained, and thereafter directing a stream of scarfing oxidizing gas at an acute angle toward the preheated area of said workpiece, and while causing relative movement between said workpiece and said stream of scarfing oxidizing gas so as to produce a scarfing cut.

2. The method as defined in claim 1 comprising the further step of stabilizing the preheating gas stream by directing a stabilizing stream of oxidizing gas in a direction parallel to and immediately above said preheating gas stream.

3. The method as defined in claim 2 wherein the step of stabilizing the preheating gas stream further includes directing a second stabilizing stream of oxidizing gas in a direction parallel to and immediately below said preheating gas stream.

4. The method as defined in claim 3 wherein said second stabilizing stream of oxidizing gas and said stream of scarfing oxidizing gas are discharged from the same outlet port.

5. The method as defined in claim 1 wherein said central stream of oxidizing gas is discharged at a substantially supersonic speed.

6. The method as defined in claim 5 wherein said concentric stream of fuel gas is discharged at a speed less than the speed of said central stream of oxidizing gas.

7. The method as defined in claim 6 comprising the further step of stabilizing the preheating gas stream by directing a first stabilizing stream of oxidizing gas in a direction parallel to and immediately above said preheating gas stream, and directing a second stabilizing stream of oxidizing gas in a direction parallel to and immediately below said preheating gas stream, and wherein said first and second stabilizing streams of oxidizing gas are discharged at respective speeds which are less than the speed of said stream of fuel gas.

8. A method for thermochemically scarfing a metal workpiece comprising the steps of
  providing a manifold and head assembly which includes upper and lower preheat blocks, with said blocks being spaced from each other to define an oxygen scarfing slot therebetween, and a plurality of discharge nozzles mounted in said upper block adjacent to each other in a row above and parallel to said slot, with each nozzle including a central bore for receiving an oxidizing gas from said manifold and head assembly and discharging the same as a high speed central stream, and outer channel means for receiving a fuel gas from said manifold and head assembly and discharging the same in a substantially concentric stream disposed coaxially about and parallel to said central stream of oxidizing gas,
  positioning the manifold and head assembly at a diagonal standoff distance from an end of an elongate metal workpiece,
  preheating the end of the metal workpiece and including generating a high speed stream of oxidizing gas through said central bore of each of said nozzles and while generating a stream of fuel gas through said outer channel means of each of said nozzles, with the streams being ignited and directed toward the end of the metal workpiece, then substantially terminating the streams of the oxidizing gas and fuel gas from said nozzles, and
  scarfing the workpiece and including generating a high speed stream of scarfing oxidizing gas from said slot, and while moving the workpiece horizontally toward and then past said manifold and head assembly so as to produce a scarfing cut.

9. The method as defined in claim 8 wherein the step of moving the workpiece includes accelerating the workpiece over a time period in order to reach a final scarfing speed, and including the further step of closing the manifold and head assembly so that it moves into contact with the moving workpiece during said time period.

10. The method as defined in claim 9 wherein the step of moving the workpiece includes commencing the acceleration of the workpiece to a first speed substantially concurrently with the commencement of the step generating a high speed stream of scarfing oxidizing gas from said slot, holding the speed of the workpiece at said first relatively slow speed for a period of time, and then again accelerating the workpiece to said final scarfing speed.

11. The method as defined in claim 10 wherein the step of closing the manifold and head assembly commences substantially concurrently with the step of accelerating the workpiece to said final scarfing speed, and the step of closing the manifold and head assembly terminates substantially concurrently with the workpiece reaching said final scarfing speed.

12. The method as defined in claim 11 wherein the step of terminating the streams of oxidizing gas and fuel gas from said nozzles, and the step of scarfing the workpiece commence substantially concurrently.

13. The method as defined in claim 12 wherein the final scarfing speed of the workpiece is between about three to four times faster than said first speed of the workpiece.

14. The method as defined in claim 8 wherein the diagonal standoff distance of the manifold and head assembly from the end of the workpiece is between about six to ten inches during the preheating step.

15. The method as defined in claim 14 wherein the horizontal standoff distance of the manifold and head assembly from the end of the workpiece is between about three to five inches during the preheating step.

16. The method as defined in claim 15 wherein the vertical standoff distance of the manifold and head assembly from the end of the workpiece is between about one and one half and two inches during the preheating step.

17. The method as defined in claim 8 wherein the step of generating a high speed stream of scarfing oxidizing gas commences about two seconds before the step of moving the workpiece commences.

18. The method as defined in claim 8 wherein said lower block includes a fuel gas flow channel and discharge outlet positioned adjacent and below said scarfing slot, and wherein the step of scarfing the workpiece includes concurrently discharging a stream of fuel gas through said discharge outlet.

* * * * *

UNITED STATES PATENT AND TRADEMARK OFFICE
CERTIFICATE OF CORRECTION

PATENT NO. : 5,304,256
DATED : April 19, 1994
INVENTOR(S) : Michael S. Showalter, et al.

It is certified that error appears in the above-identified patent and that said Letters Patent is hereby corrected as shown below:

Column 10, line 16, omit "relatively slow".

Column 10, line 44, after "and" omit the dash (-).

Signed and Sealed this

Twenty-sixth Day of July, 1994

Attest:

BRUCE LEHMAN

*Attesting Officer*     *Commissioner of Patents and Trademarks*